(12) United States Patent
Guazzoni (10) Patent No.: US 9,409,242 B2
(45) Date of Patent: Aug. 9, 2016

(54) MACHINE FOR MACHINING MATERIALS IN BLOCKS OR SLABS AND MACHINING METHOD TO BE ACTUATED THROUGH SUCH A MACHINE

(75) Inventor: Luigi Guazzoni, Verbania (IT)

(73) Assignee: GMM S.p.A., Gravellona Toce, VB (IT)

( * ) Notice: Subject to any disclaimer, the term of this patent is extended or adjusted under 35 U.S.C. 154(b) by 437 days.

(21) Appl. No.: 13/698,225

(22) PCT Filed: Feb. 22, 2011

(86) PCT No.: PCT/EP2011/000834
§ 371 (c)(1),
(2), (4) Date: Nov. 15, 2012

(87) PCT Pub. No.: WO2011/144270
PCT Pub. Date: Nov. 24, 2011

(65) Prior Publication Data
US 2013/0055550 A1    Mar. 7, 2013

(30) Foreign Application Priority Data
May 17, 2010 (IT) .............................. MI2010A0876

(51) Int. Cl.
*B28D 1/00* (2006.01)
*B23D 45/02* (2006.01)
(Continued)

(52) U.S. Cl.
CPC .............. *B23D 45/027* (2013.01); *B23D 47/04* (2013.01); *B28D 1/00* (2013.01); *B28D 1/043* (2013.01); *B28D 7/043* (2013.01); *Y10T 29/49995* (2015.01)

(58) Field of Classification Search
CPC ...... B23D 45/027; B23D 47/04; B28D 1/043; B28D 1/00; B28D 7/043; Y10T 29/49995
USPC ........ 29/240, 281.1, 281.4, 281.5, 281.6, 283
See application file for complete search history.

(56) References Cited

U.S. PATENT DOCUMENTS 3,566,932 A    3/1971 Papenmeier
6,796,014 B2 *  9/2004 Sarh ........................... 29/407.09
8,413,307 B2 *  4/2013 Katzenberger et al. ......... 29/240

FOREIGN PATENT DOCUMENTS

EP    0830922 A2   3/1998
EP    1651409 B1   1/2007
(Continued)

OTHER PUBLICATIONS

European Patent Office, International Search Report (PCT/EP2011/000834), May 27, 2011, Rijswijk, Netherlands.
(Continued)

*Primary Examiner* — Richard Chang
(74) *Attorney, Agent, or Firm* — Duane Morris LLP (57) ABSTRACT

A machine for machining materials in blocks or slabs includes: a) a tool-holder unit displaceable above an external working surface, in a parallel and orthogonal directions with respect to the working surface; b) a manipulator unit which is coupled to the tool holder unit, and includes gripping means of a material in block or slab to be worked; wherein the gripping means are moveable between a first inoperative position, which is distal with respect to the working surface, and a second operative position, which is proximal with respect to the working surface. The gripping means are rotatable between the first inoperative position and the second operative position.

18 Claims, 8 Drawing Sheets

(51) Int. Cl.
  *B23D 47/04* (2006.01)
  *B28D 1/04* (2006.01)
  *B28D 7/04* (2006.01)

(56) References Cited

FOREIGN PATENT DOCUMENTS

| EP | 1870201 | A1 | 12/2007 |
| EP | 2253422 | A1 | 11/2010 |
| JP | 2000128555 | | 5/2000 |
| WO | 2006/043294 | A1 | 4/2006 |
| WO | 2006/057024 | A1 | 6/2006 |

OTHER PUBLICATIONS

English translation of Office Action issued on Jun. 4, 2014, for corresponding Chinese Patent Application No. 201180024612.9, 6 pages.

* cited by examiner

MACHINE FOR MACHINING MATERIALS IN BLOCKS OR SLABS AND MACHINING METHOD TO BE ACTUATED THROUGH SUCH A MACHINE

BACKGROUND OF THE INVENTION

The present invention refers to a machine for machining materials in blocks or slabs, particularly, but not exclusively, stone materials, like for example marbles and granites, and to a method for machining materials able to be actuated through such a machine.

By the term "machining" we mean to generically indicate any operation carried out on a piece of material, like for example cutting, squaring or shaping.

PRIOR ART

Machines for machining materials in blocks or slabs, and in particular stone materials, essentially comprise a table that defines a working surface on which the block or slab to be machined is laid, a tool-holder unit with which a machining tool is associated, for example a circular blade or a milling cutter, is associated, a moving apparatus of the tool-holder unit and a operation and control unit equipped with a suitable operator interface.

It should be specified that, in the present description and the attached claims, by the expression "moving apparatus", we mean to indicate an apparatus suitable for determining any movement of the tool-holder unit, be it a translation or a rotation.

The tool-holder unit has a plurality of supply lines connected to it, for example electrical or for transporting a coolant fluid to the machining tool. The moving apparatus is mounted on a horizontal bridge that rests on walls or other vertical support structures.

The bridge is mobile on the respective support structures and the moving apparatus is mobile along the bridge. In this way, the moving apparatus and the tool-holder unit can be moved parallel to the working surface along two axes X and Y perpendicular to one another. In turn, the moving apparatus can move the tool-holder unit along a further moving direction Z perpendicular to the working surface. In order to be able to carry out machining along both moving directions X and Y as well as along oblique directions, it is also foreseen to rotate the tool-holder unit around the axis Z, in practice the vertical axis, so as to have the piece of material being machined at the machining tool according to different angles.

In addition to the first positioning of the piece to be machined on the working surface, it is often necessary to reposition the piece, or a part thereof, one or more times between the different successive steps of the machining. For example, it is frequently the case that, after having carried out a cut on the piece, it is necessary to take away one of the cut portions in order to avoid that, when carrying out other cuts that are perpendicular or oblique with respect to the first cut, the machining tool interferes with the part of the slab not involved in the machining that is being carried out.

The moving with respect to the working surface of the pieces of material is conventionally carried out by overhead travelling cranes or forklifts that are independent from the machine for machining the pieces; overhead travelling cranes and forklifts are often equipped with suctions cups for holding the slabs. Alternatively, machining machines have been proposed that are provided with a manipulator unit mounted in a mobile manner on the bridge by means of an autonomous moving apparatus, or supported autonomously by a corresponding frame. The manipulator unit is also controlled by an operation and control unit along the three axes X, Y and Z. This solution clearly involves substantial complications in terms of the management of the machine during its operation. For example, the manipulator unit and the tool-holder unit must not collide, the precision in the positioning of the pieces being machined must be the maximum without errors occurring in the correlation between the two reference systems.

An improved solution is described in European patent EP-B-1651409. In this case a manipulator unit is fixedly mounted to the head of the tool-holder unit and can translate with such a unit along the perpendicular axes X, Y and Z and can rotate around the axis Z. The manipulator unit, of the pneumatic type, comprises suction caps intended to hold the piece that must be displaced with respect to the working surface. A linear actuator of the manipulator unit, actuated by the operation and control unit, has the function of translating the suction caps along the axis Z with respect to the tool-holder unit. The linear actuator allows the suction caps to be taken into a lower position with respect to the tool and, therefore, in contact with the piece to be manipulated; in this way, the machining tool is kept away from the surface of the piece. In other words, the gripping and release of a piece from/onto the working table foresee a certain distance along the axis Z both covered by the travel of the linear actuator of the manipulator unit and the possible further distance is covered by the travel along the axis Z of the tool-holder unit.

SUMMARY OF THE INVENTION

The Applicant has developed an alternative to the previous solution in which it is prevented from having to manage the excursion or the displacement along the axis Z of two distinct units (tool-holder and manipulator) to complete the manipulation of the piece to be or being machined.

The technical problem forming the basis of the present invention is therefore to further simplify the machines described above for machining materials in blocks or slabs. In particular, the technical problem is to eliminate the linear actuator for the activation of the suction caps. The invention therefore concerns, in a first aspect thereof, a machine for machining materials in blocks or slabs according to claim 1.

In particular, the invention concerns a machine for machining materials in blocks or slabs comprising:
a) a tool-holder unit displaceable above an external working surface, parallel and perpendicular to the working surface;
b) a manipulator unit coupled with said tool-holder unit and comprising gripping means of a material in blocks or slabs to be machined;
in which said gripping means are mobile between a first inoperative position, distal with respect to the working surface, and a second operative position, proximal with respect to the working surface;
characterised in that said gripping means can be rotated between said first inoperative position and said second operative position.

Unlike the solution described in EP-B-1651409, in which the gripping means are activated with an additional vertical translation with respect to the vertical translation of the tool-holder unit, in the machine according to the present invention the gripping means can be rotated into the operative position, in which they stay as long as necessary, to then be taken back into the inoperative position. This characteristic allows the same system of coordinates X, Y and Z relative to the tool-holder unit and, therefore, the same moving apparatus, to be used, for the manipulator unit. An operation and control unit of the machine will therefore use a single system of coordinates to move both the tool-holder unit, and the manipulator, avoiding the correlation of distinct reference systems, with clear simplification of the operation of the machine as a whole.

The machine according to the present invention also does not need the linear actuator for the vertical translation of the gripping means.

Preferably, in turn the tool-holder unit is hinged to the corresponding moving apparatus and is able to rotate between an operative position, in which the tool can interact with the block or the slab being processed and the gripping means are in the relative first inoperative position, and a second inoperative position, in which the tool cannot interact with the block or the slab and the gripping means are in the relative second operative position.

More preferably, the gripping means and said tool-holder unit describe corresponding circular arcs when rotating. Preferably, the machine comprises a support structure. For the purposes of the present invention, by the expression "support structure" we mean to identify the set of structural elements assembled to support the tool-holder unit and the relative moving apparatus suspended with respect to the working surface. Preferably, as described in relation to the prior art, the support structure comprises walls or other vertical structures and a horizontal bridge that rests on it. The moving apparatus connects and constrains the tool-holder unit to the support structure, preferably to the relative bridge.

Preferably, the moving apparatus comprises a shaft, at the lower end of which the tool-holder unit is coupled, and a motorised trolley to which the upper end of the shaft is fixedly connected.

Preferably, the bridge of the support structure can be moved on the respective vertical support structures and the moving apparatus (the relative motorised trolley) can move along the bridge. The shaft of the moving apparatus can translate along the axis Z or else it is telescopic to take the tool towards or away from the block or slab being machined. The described structure allows displacements of the tool-holder unit parallel and perpendicular to the working surface (arranged below the tool-holder unit). Preferably, the rotation of the gripping means takes place around an axis perpendicular to the axis Z. For example, the gripping means can be flipped from the inoperative position, substantially vertical and distal with respect to the slab being machined, to the operative position, substantially horizontal and proximal with respect to the slab being machined.

In an embodiment of the machine according to the present invention, the gripping means are fixedly coupled with the tool-holder unit—preferably with a casing of such a unit—, and in turn the tool-holder unit is hinged to the corresponding moving apparatus. The gripping means and the tool-holder unit rotate as a unit. The rotation is preferably controlled by a motor mounted on the moving apparatus, or alternatively on the tool-holder unit. When the tool-holder unit is operative, i.e. when the relative tool is arranged to machine the material on the working surface, the gripping means are in the first inoperative position; when the gripping means are rotated into the second operative position, proximal to the material to be manipulated, the tool-holder unit is rotated into an inoperative position, at which the tool (which stays horizontal) cannot interact with the material being machined.

Preferably, the rotation of the gripping means and of the tool-holder unit is between 0° and 90°. Preferably, the gripping means and the tool-holder unit describe corresponding circular arcs when rotating. Therefore, in the relative operative position (proximal to the material to be machined) the gripping means are at the height (along the axis Z and with respect to the moving apparatus) occupied by the cutting tool when the latter is operative.

Preferably, the tool-holder unit can rotate around the axis Z. This characteristic makes it possible to tilt the tool with respect to the axes X and Y.

Preferably, the manipulator unit is provided with pneumatic gripping means.

Preferably, the gripping means comprise at least one plate, provided with at least one suction cap, and one or more air suction ducts that open in each suction cap. For example, each suction cap can be defined by a shaped gasket applied to the plate so as to circumscribe a portion of the relative surface and the suction ducts are in part formed in the material of the plate and open into the surface defined by the gasket.

Preferably, the manipulator unit comprises one or more valves intercepting the suction ducts. Such valves can be arranged along sections of the corresponding ducts outside the plate, otherwise they can be coupled directly with the plate or with the tool-holder unit.

Preferably, the intercepting valves are electrically operated valves that can be operated by a control and operation unit, which can be external or part of the machine.

When the suction caps are in abutment against a slab to be machined, in practice when the plate of the gripping means is arranged in the second operative position and resting on the piece to be machined, the gaskets are at least in part compressed against the surface of the slab; the opening of the valves intercepting the suction ducts allows a depression to be created in the volume located between the slab and the plate, actually making a suction cap effect. In this operating mode the lifting along the axis Z of the gripping means and/or of the tool-holder unit causes the corresponding lifting of the slab being machined, which can consequently be repositioned. The closing of the suction ducts causes the recovery of the pressure in the volume located between the material and the plate and the consequent release of the slab.

The machine according to the invention can be equipped with a proximity sensor or a limit switch, arranged on the gripping means or on the tool-holder unit, having the function of indicating when the gripping means or the tool-holder unit is a predetermined distance from the material being machined. The signal generated by the sensor, suitably processed, can be used to prevent violent collisions of the gripping means against the material being machined.

Preferably, the machine comprises a control and operation unit of the movements of the tool-holder unit and of the relative moving apparatus with respect to the external working surface, and of the movements of the gripping means with respect to the tool-holder unit or to the relative moving apparatus.

In a second aspect thereof, the invention concerns a method according to claim 13.

In particular, the invention concerns a method for machining materials in blocks or slabs comprising the steps of:
a) arranging a working surface and placing thereon a block or slab to be machined;
b) displacing the block or slab being machined on the working surface,
c) carrying out a machining operation on said block or slab, in which said step b) is carried out by a machine for machining materials in blocks or slabs comprising a tool-holder unit, which is moveable parallel and orthogonal with respect to said working surface, and a manipulator unit, in turn comprising gripping means of the block or slab, and in which the tool-holder unit and the manipulator unit are coupled one to another, and in which said gripping means are moveable between a first inoperative position, which is distal with respect to the block or slab, and a second operative position, which is proximal with respect to the block or slab; characterised by the step of d) rotating said gripping means between said first inoperative position and said second operative position.

In particular, step d) comprises the further step of:

d1) rotating the tool-holder unit from a first operative position, in which a tool thereof can engage with the block or slab, into a second inoperative position, in which the tool cannot engage with the block or slab.

Preferably the gripping means are of the pneumatic type and step b) comprises the step of activating or deactivating the gripping means to hold or release, respectively, the block or the slab.

Preferably, the gripping means rotate as a unit with the tool-holder unit around a horizontal axis E-E. In this circumstance, the repositioning of the block or slab is obtained by carrying out the steps:

rotating the gripping means into the relative second operative position and at the same time rotating the tool-holder unit into the relative second inoperative position;

taking the gripping means into abutment against the surface of the block or slab that is on the working surface in an initial position;

activating the gripping means to hold the block or slab;

repositioning the block or slab on the working surface by displacing the gripping means parallel and/or perpendicularly to the working surface and/or rotating them about the vertical, and deactivating the gripping means to release the block or slab in the new final position. The machining of the block or slab, on the other hand, foresees the steps of:

rotating the tool-holder unit into the relative first operative position and at the same time rotating the gripping means into the relative first inoperative position;

taking a tool of the tool-holder unit in abutment against the surface of the block or slab that is on the working surface;

activating the tool and, if necessary, displacing the tool-holder unit.

Advantageously the machine and the method according to the present invention can also be used to machine the moulds used in the field of nautical science to make hulls, keels and structures made from fibreglass or similar materials.

BRIEF DESCRIPTION OF THE FIGURES

Further characteristics and advantages of the present invention will become clearer from the following description of a preferred embodiment thereof, made hereafter, for indicating and not limiting purposes, with reference to the attached drawings. In such drawings.

DETAILED DESCRIPTION OF A PREFERRED EMBODIMENT OF THE INVENTION

Figure 1:
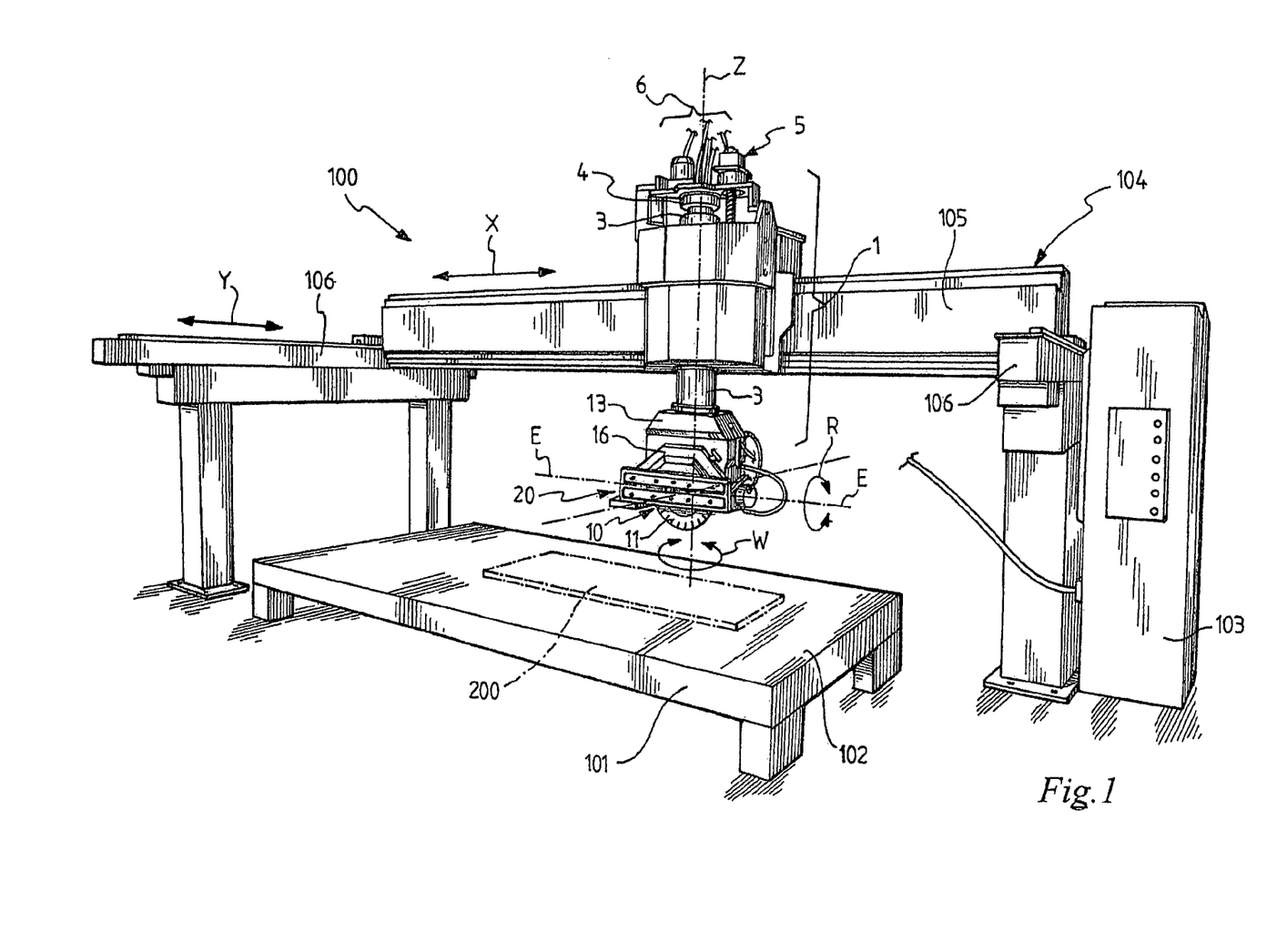
FIG. 1 is a schematic perspective view of a machine for machining materials in blocks or slabs in accordance with the invention.

In FIG. 1, reference numeral 100 wholly indicates a machine for machining materials in blocks or slabs, in particular, but not exclusively, stone materials, according to the invention.

A table 101 is shown defining a working surface 102. The table can be fixed, like in the example shown, or else motorised and rotatable about the vertical. In general, the table 101 is not part of the machine 100; alternatively, the table 101 can be a component of the machine 100. The material in slabs to be machined is indicated with reference numeral 200.

In general, the machine 100 comprises a tool-holder unit 10, the relative moving apparatus 1 and a support structure 104.

The support structure 104 has the function of keeping the tool-holder unit 10 and the relative moving apparatus 1 suspended above the working surface 102, on which the slab 200 is positioned. In the embodiment shown in the attached figures, the support structure 104 comprises a bridge 105 that rests, at its ends, on walls 106 or other equivalent support structures, extending in a direction perpendicular to the bridge 105 itself. The support structure 104 also comprises at least the elements 105 and 106.

Figure 8:
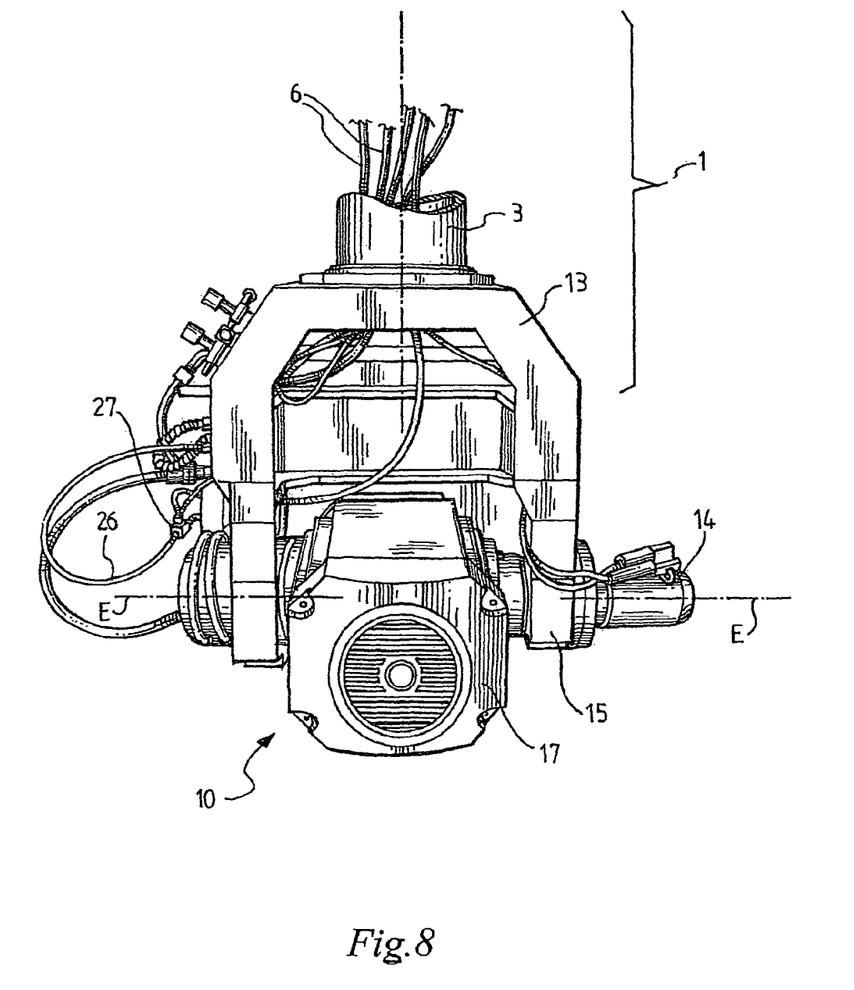
FIG. 8 is a schematic rear view of the detail shown in FIG. 4.

The moving apparatus 1 comprises a motorised trolley 2, suitable for moving on the bridge 105 parallel to the axis X, and a shaft 3. At the lower end of the shaft 3 there is the fork-shaped body 13 shown in FIG. 8, to which the tool-holder unit 10 is fixedly connected and at the upper end of the same shaft 3 there is a gear reducer 4, preferably with zero clearance. The moving apparatus 1 also comprises at least the components 2, 3, 13.

The shaft 3 can translate along the axis Z thanks to the presence of linear actuators 5 fixedly connected to the upper end of the shaft 3, for example fixedly connected to the reducer 4, and to the trolley 2. The apparatus 1 also has the function of guiding the supply lines 6 towards the tool-holder unit 10.

The supply lines 6 preferably comprise at least one electrical power line and at least one supply line of a fluid, for example water, intended to cool down the machining tool 11 during operation. Preferably, the shaft 3 is hollow and the supply lines 6 are housed in the relative inner cavity.

Preferably, the moving apparatus 1 is arranged to move the tool-holder unit 10 also in rotation around the axis Z. Such a rotation, operated by a motor by interposition of the reducer 4, is indicated by the arrow W.

The moving apparatus 1 can move along the bridge 105 and the latter can move parallel to the direction of extension of the walls 106. The moving apparatus 1, and with it the tool-holder unit 10, can therefore be moved parallel to the working surface 102 along two axes, respectively indicated with X and Y, perpendicular to one another and, as has been seen above, it can be moved parallel to the axis Z and it can rotate around this axis.

The tool-holder unit 10 has a machining tool 11 associated with it. As an example, the machining tool 11 is represented here in the form of a disk-type cutter to carry out cutting operations, but it could be any other known machining tool, like for example a slot mill, a grinding wheel, etc.

With reference to FIGS. 2-8, the tool-holder unit 10 essentially comprises an electrospindle 12 suitable for setting the machining tool 11 associated with it in rotation. The electrospindle 12 is in turn actuated by a motor 17. Preferably, the electrospindle 12 is supported by the support body 13 of the moving apparatus 1 fixedly connected with the shaft 3. In particular, the electrospindle 12 is supported, through rotation pins 15, able to rotate around a respective rotation axis E-E, perpendicular to the vertical axis Z. In practice, the electrospindle 12 and the tool 11 can be flipped with respect to the support body 13. In this sense the tool-holder unit 10 is able to rotate around the axis E-E (the support body 13 on the other hand does not rotate around the same axis E-E). Preferably, the support body 13 rotates as a unit with the shaft 3 around the axis Z. The tool-holder unit also comprises at least the elements 11, 12, 14, 15, 17, but not the support body 13 that is part of the moving apparatus.

In the embodiment illustrated here, the tool-holder unit 10 comprises a motor 14 suitable for moving the electrospindle 12 around the rotation axis E-E to vary the angle of inclination of the electrospindle 12 with respect to the shaft 3. In this way, the machining tool 11 can be moved according to a further direction of movement, indicated in the figures with R, to easily make, for example inclined cuts or profiled shapes.

Figure 4:
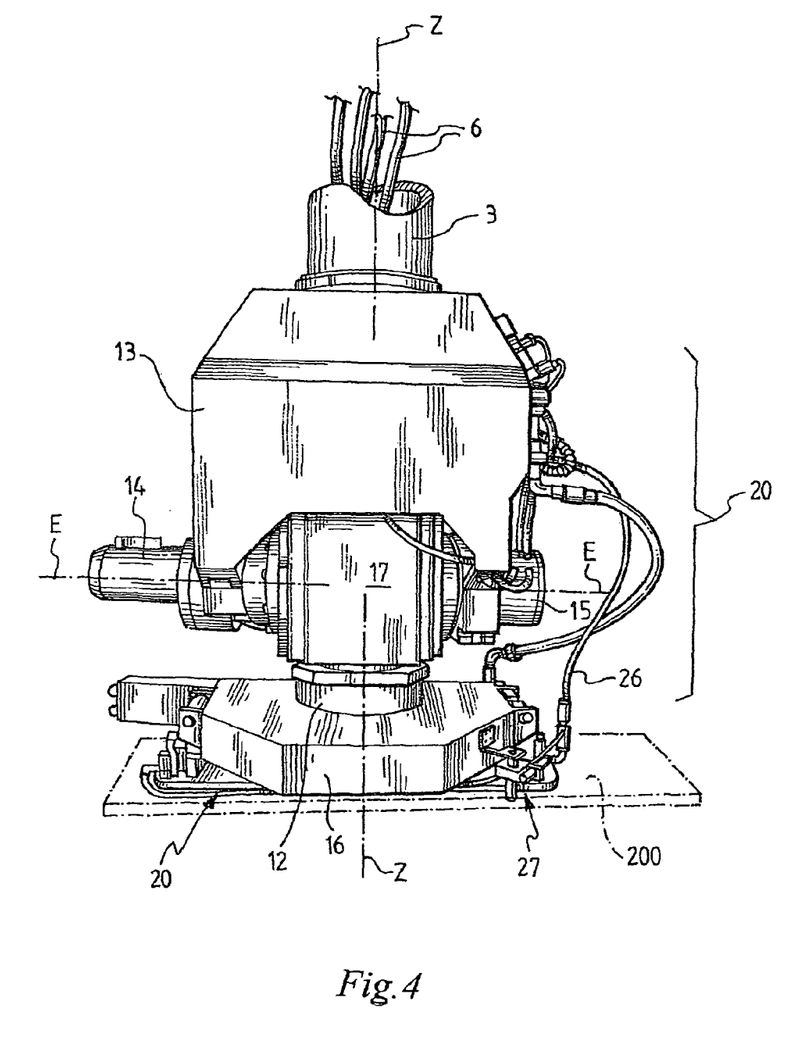
FIG. 4 is a schematic front view of a detail of the machine shown in FIG. 1, relative to the tool-holder unit and to the gripping means, in a second configuration.

Depending on the circumstances, the machining tool 11 can be at least partially covered by a protective casing 16 as shown in the figures and in particular in FIG. 4.

The machine 100 comprises a manipulator unit 20 having the function of holding the slab 200 suspended with respect to the working surface 102, allowing it to be repositioned. In the embodiment shown in the figures, the manipulator unit is of the pneumatic type and comprises gripping means provided with one or more pneumatically-activated suction caps, able to be flipped between an initial inoperative position, in which the suction caps cannot engage with the slab 200 irrespective of the position of the shaft 3, and a final operative position, in which the suction caps can come into contact with the upper surface of the slab 200 when the shaft 3 is lowered along the axis Z on the same slab 200.

In an embodiment, not shown in the attached figures, the gripping means of the manipulator unit 20 comprise a plate 21 and the suction caps are formed in such a plate. The plate 21 is hinged or pivoted to the moving apparatus 1, for example to an external protective casing thereof or directly to the support body 13.

Figure 5:
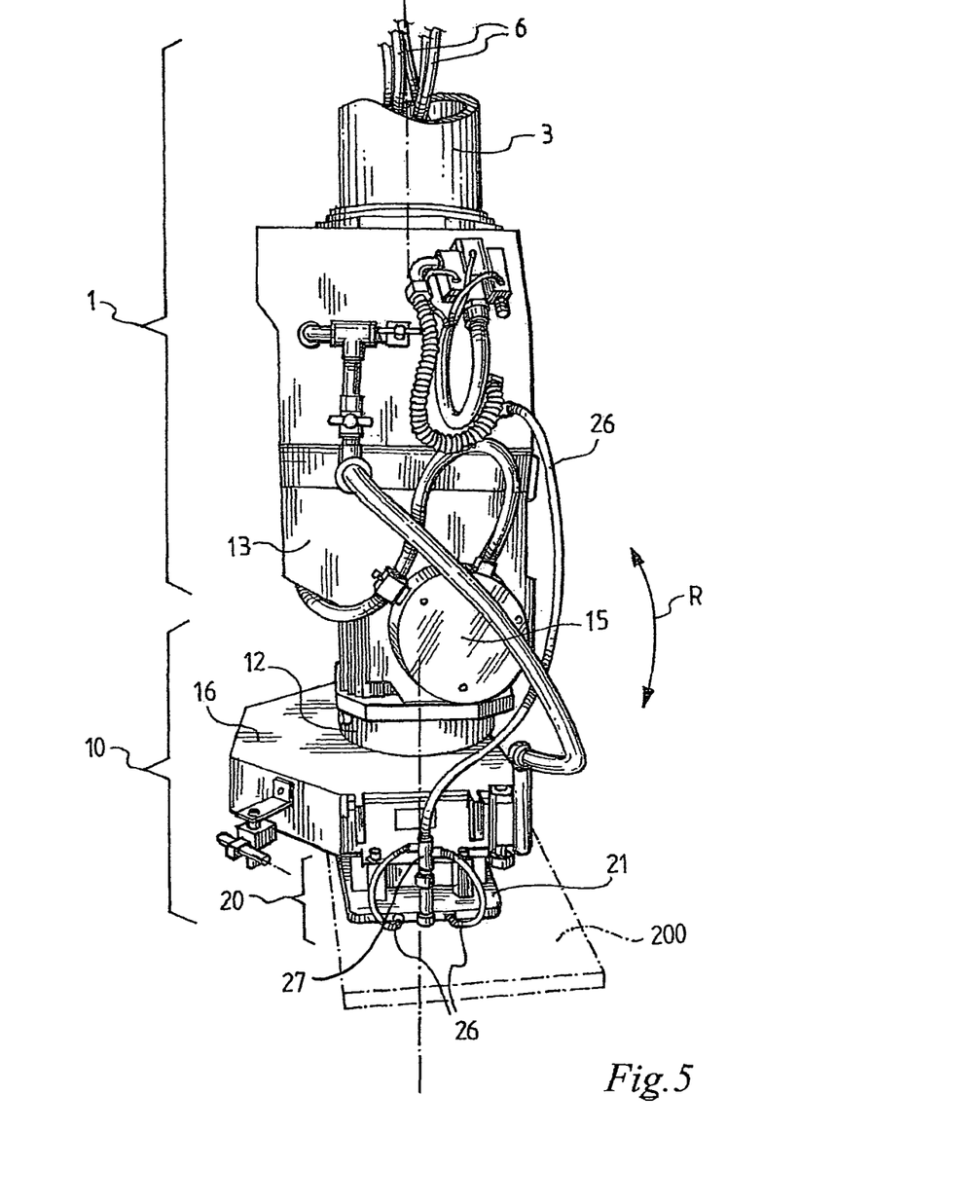
FIG. 5 is a schematic perspective and side view of the detail shown in FIG. 4.
Figure 6:
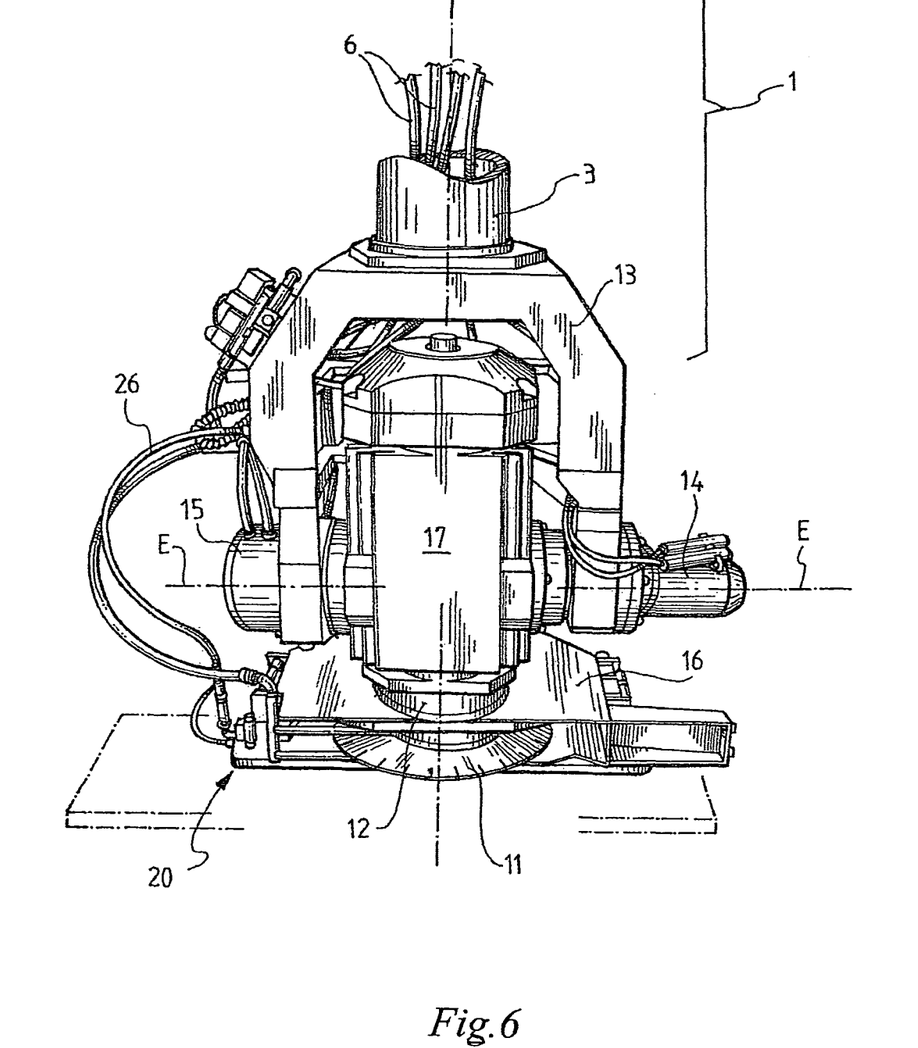
FIG. 6 is a schematic rear view of the detail shown in FIG. 4.

Preferably, as shown in FIGS. 1-8, and in particular in FIGS. 4-7, the gripping means of the manipulator unit 20 comprise a plate 21 and the relative suction caps, and the plate 21 is firmly fixed to the al tool-holder unit 10 and can rotate with it around the axis E-E. With reference to FIGS. 4 and 5, in the example shown the plate 21 is fixed with screws to the casing 16 covering the tool 11.

Figure 2:
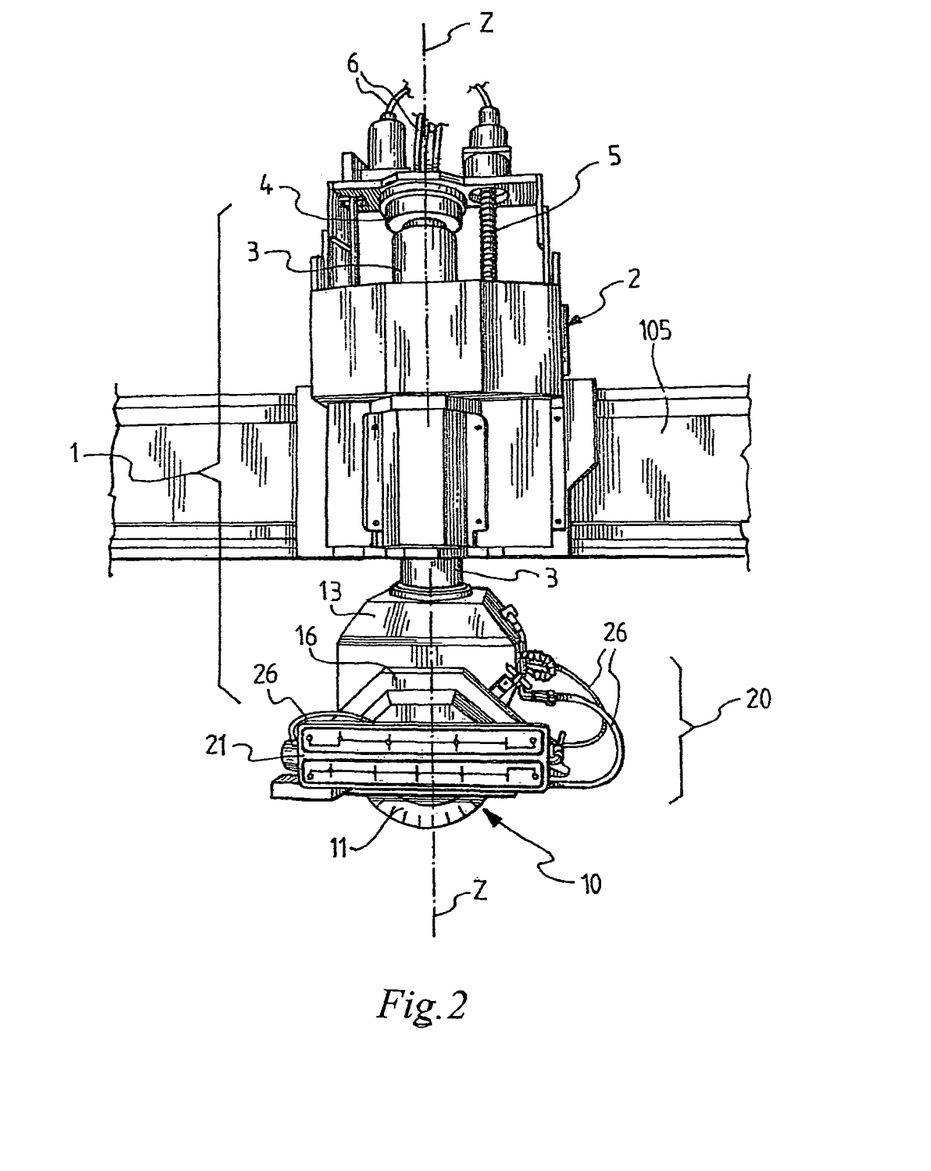
FIG. 2 is a schematic perspective view of a detail of the machine shown in FIG. 1, relative to the tool-holder unit, to its moving apparatus and to the gripping means, in a first configuration.
Figure 3:
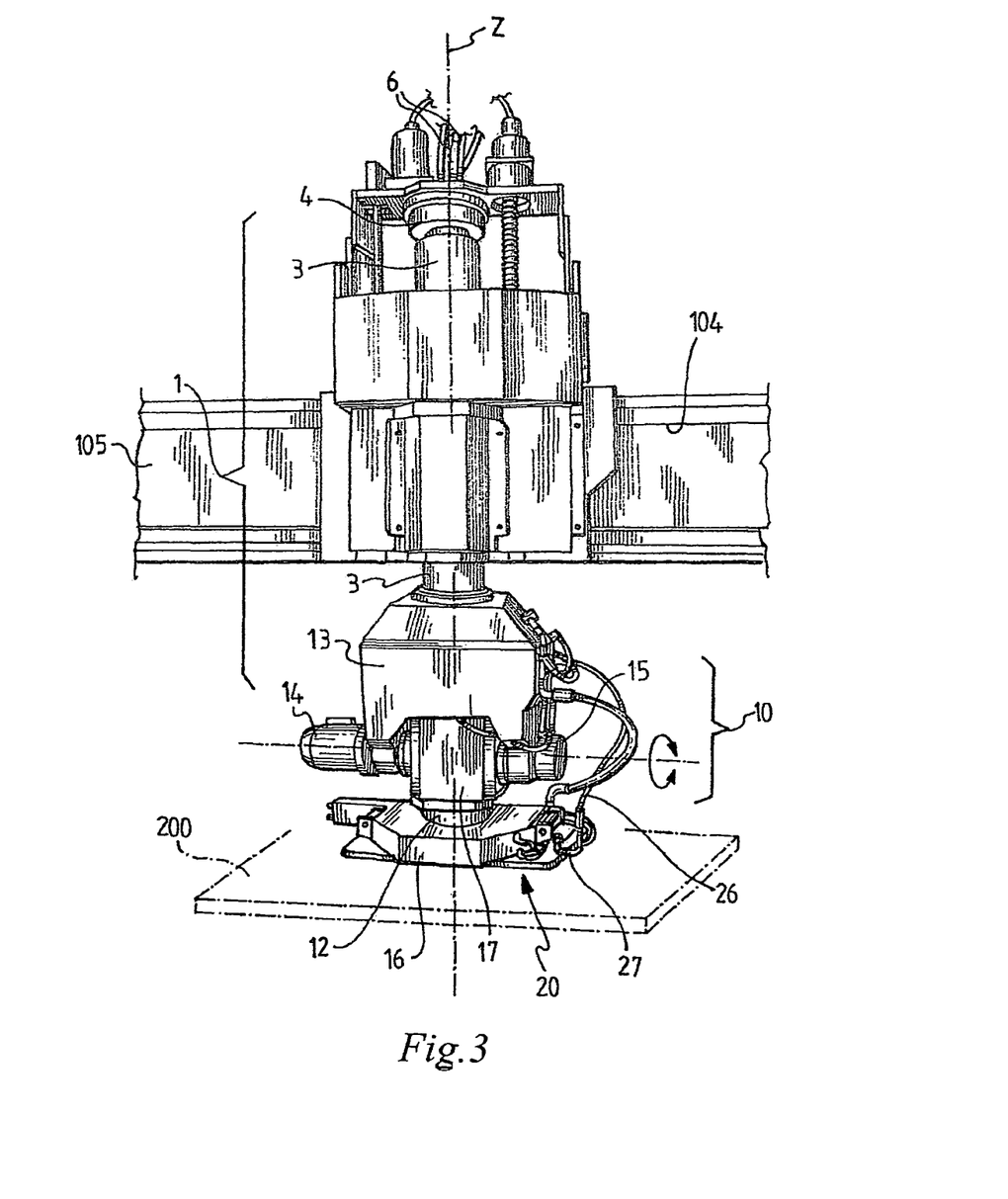
FIG. 3 is a schematic perspective view of a detail of the machine shown in FIG. 1, relative to the tool-holder unit, to its moving apparatus and to the gripping means, in a second configuration.
Figure 7:
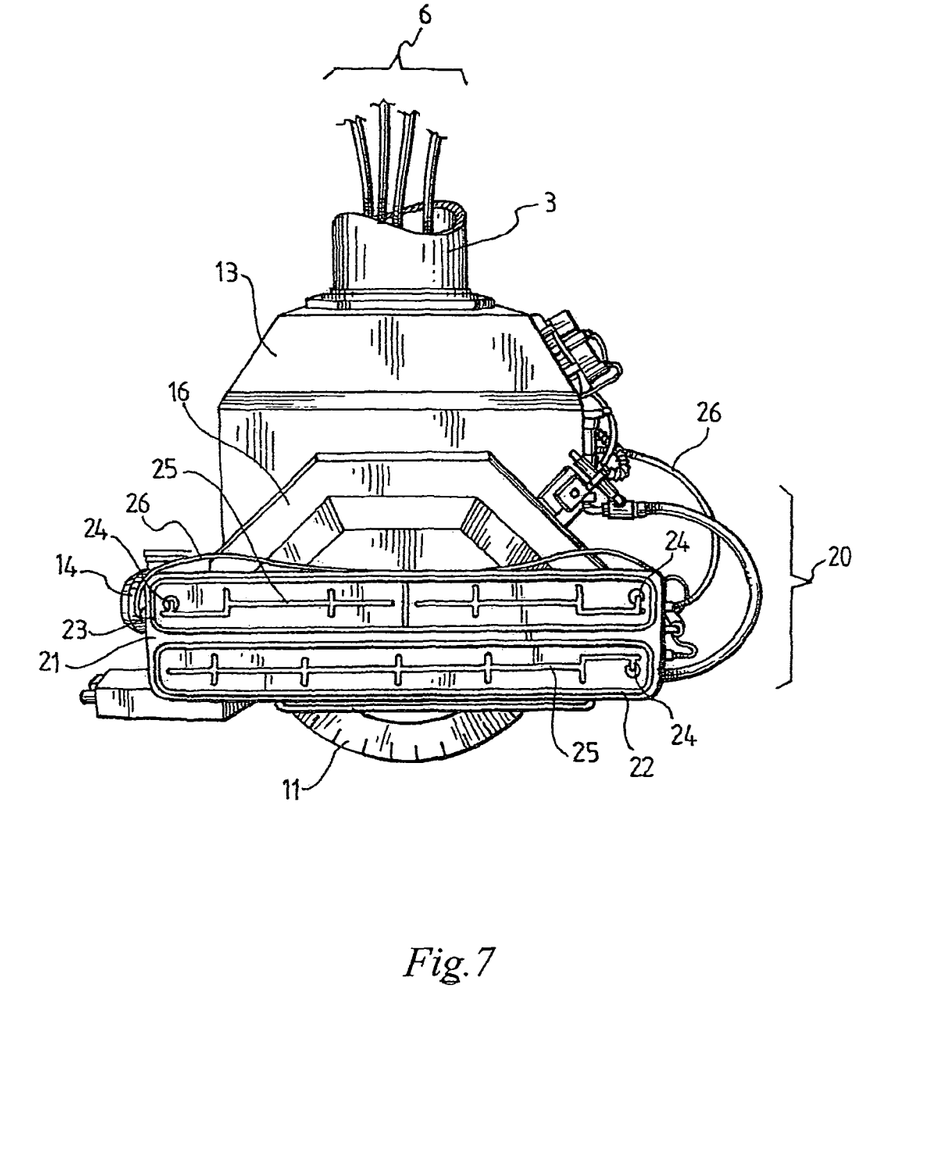
FIG. 7 is a schematic front view of a detail of the machine shown in FIG. 1, relative to the tool-holder unit and to the gripping means, in a first configuration.

The first inoperative position of the plate 21 is vertical, as shown in FIGS. 1, 2 and 7, and it corresponds to a work position of the tool 11 that stays facing towards the upper surface of the slab 200; the second operative position of the plate 21 is horizontal and perpendicular to the shaft 3, as shown in the remaining figures, and it corresponds to an inoperative position of the tool 11, which stays parallel to the upper surface of the slab 200. The rotation of the tool-holder unit 10, and therefore of the gripping means 20 can preferably vary between about 0° and about 90°. Preferably, like in the case shown in the attached figures, the motor 14 that operates the rotation is at least partially integrated with at least one of the rotation pins 15. Preferably, the motor 14 is a brushless motor. Moreover, the motor 14 preferably comprises a reducer (not shown in the figures).

The suction caps are defined by the plate 21 and by one or more gaskets that define one or more areas on the surface of the plate 21 (the surface that can face parallel to the upper surface of the slab 200). The areas intercepted by the gaskets have a closed perimeter, for example circular, rectangular, or a different shape.

With reference to FIG. 7, the plate 21 of the manipulator unit 20 comprises two gaskets 22 and 23 inserted in suitable grooves formed in the material of the same plate 21. The gaskets 22 and 23 intercept corresponding substantially rectangular portions of the surface of the plate 21. The manipulator unit also comprises one or more air suction ducts 26 that open into the aforementioned portions. Moreover, on the surface of the plate 21 surface grooves 25 are formed that connect different points of the surface with the mouth 24 of the air suction ducts 26.

When the plate 21 is in the operative position, and therefore horizontal, and it is taken by the moving apparatus 1 in abutment against the upper surface of the slab 200, the suction of the air through the ducts 26 generates a depression in the volumes defined by the slab 200 itself, by the gaskets 22, 23 and by the plate 21. The depression is regulated to obtain an effective suction cap effect that allows the slab 200 to be lifted along the axis Z together with the tool-holder unit 10.

The manipulator unit 20 also comprises one or more valves 27 intercepting the flow of air along the suction ducts 26. The suction is preferably generated by a pump or by a Venturi system, which can be external or part of the manipulator unit itself (not shown), to which the ducts 26 are connected. The intercepting valves 27 are preferably electrically operated valves and they can each be operated independently from one another to cause the depression in just one of the suction caps, for example in the suction cap defined by the gasket 22, or in both. The electrically operated valves are shown external to the plate 21, but alternatively they can be arranged on the plate 21 itself or in a space associated with it or on the casing 16 of the tool-holder unit 10.

The machine 100 also comprises an operation and control unit 103 (FIG. 1) equipped with an operator interface. The unit 103 is programmed to actuate the moving apparatus 1, the tool-holder unit 10 and the gripping means 20.

A preferred embodiment of the method for machining materials in blocks or slabs according to the invention, able to be carried out by the machine 100 described above, will now be described.

The method essentially comprises the step of arranging the block or slab 200 to be machined on the working surface 102 and then the step of moving the machining tool 11 associated with the tool-holder unit 10 to carry out machining on the block or slab 200. This moving step is carried out by the moving apparatus 1 of the tool-holder unit 10, described above.

The method also comprises the step of modifying the position of the block or slab 200 on the working surface 102, i.e. the step of repositioning the block or slab 200. This step is carried out by the manipulator unit 20.

When it becomes necessary to reposition the slab 200, the unit 103 activates the manipulator unit 20, which initially is in the configuration shown in FIGS. 1-2 and 7-8. The tool 11, raised with respect to the slab 200, faces towards it and the plate 21 is vertical and cannot come into contact with the slab 200. The tool 11 occupies a certain position along the axis Z with respect to the support body 13 of the moving apparatus.

The manipulator unit 20 is activated to rotate the gripping means, i.e. the plate 21 and the relative suction caps, into the operative position, horizontal and proximal with respect to the slab 200, shown in FIGS. 3-6. Preferably, once rotated, the plate 21 occupies the position that the tool 11 had previously along the axis Z with respect to the support body 13 of the moving apparatus 1.

The control unit 103 operates the moving apparatus 1 to take the plate 21 in abutment against the slab 200, at least partially compressing the gaskets 22, 23. The same unit 103 controls the opening of the valves 27 to obtain the suction of the air and create the depression necessary to obtain an effective suction cap effect with respect to the weight of the slab 200. In this configuration the slab stays fixedly connected to the plate 21 due to the depression and it is displaced by the moving apparatus 1 into the new position foreseen based on the coordinates X, Y and Z and based on the rotation around the axis Z programmed in the unit 103.

When the repositioning of the slab has been completed, the control unit operates the closing of the valves 27. Consequently, the pressure in the suction caps of the plate 21 is recovered and the slab is released; the plate 21 is then detached from the slab 200 and the manipulator unit 20 can be taken away from it and deactivated.

The deactivation of the manipulator unit 20 foresees the rotation around the axis E-E to take the plate 21 back into the initial position described above and at the same time position the tool 21 ready for use.

Advantageously, the repositioning of the slab 200 is obtained without worsening the calculations for the control unit 103, by simply exploiting the same reference system X, Y, Z and the relative algorithms and without needing an independent structure to support the manipulator unit.

The invention claimed is:

1. A machine for machining a material in block or slab comprising:
   a) a tool-holder unit displaceable above a working surface along a direction parallel and/or orthogonal with respect to the working surface;
   b) a manipulator unit of the material in block or slab coupled to said tool-holder unit and comprising gripping means of the material in block or slab to be worked;
   wherein said gripping means are:
   moveable between a first inoperative position, distal with respect to the working surface, wherein a machining tool of the tool-holder unit is arranged to machine the material in block or slab, and a second operative position, proximal with respect to the working surface, wherein the machining tool of the tool-holder unit cannot interact with the material in block or slab being machined; and
   rotatable as a unit with said tool-holder unit between said first inoperative position and said second operative position.

2. The machine according to claim 1, wherein said tool-holder unit can be translated along:
   axes X and Y arranged orthogonal to one another and parallel to the working surface, and
   an axis Z orthogonal to said axes X and Y,
   and wherein said gripping means are rotatable about an axis E-E orthogonal to said axis Z.

3. The machine according to claim 2, wherein the tool-holder unit is rotatable about said axis Z.

4. The machine according to claim 1, further comprising:
   a moving apparatus of said tool-holder unit, and
   a support structure of the moving apparatus and of the tool-holder unit above said working surface,
   wherein said gripping means are fixedly coupled to the tool-holder unit.

5. The machine according to claim 4, wherein the tool-holder unit is hinged to said moving apparatus and is rotatable between a first operative position, wherein the tool can interact with the material in block or slab being worked and the gripping means are in their respective first inoperative position, and a second inoperative position, wherein the tool can not interact with the material in block or slab and the gripping means are in their second operative position.

6. The machine according to claim 5, wherein said gripping means and said tool-holder unit travel along corresponding circular arcs during rotation.

7. The machine according to claim 4, comprising a operation and control unit for controlling movements of said tool-holder unit and of said moving apparatus of the tool-holder unit with respect to the external working surface and movements of said gripping means.

8. The machine according to claim 1, wherein said gripping means are rotatable according to an angle of rotation comprised in the range from 0° to 90°.

9. The machine according to claim 1, wherein said gripping means are pneumatic.

10. The machine according to claim 9, wherein said gripping means comprise at least a plate provided with at least one suction cap and wherein said manipulator unit comprises one or more air suction ducts open within each suction cap.

11. The machine according to claim 10, wherein said manipulator unit comprises one or more valves intercepting said air suction ducts.

12. The machine according to claim 11, wherein said valves are electrically operated valves which can be operated by an external operation and control unit.

13. A method for machining a material in block or slab comprising the steps of:
   a) placing the material in block or slab to be machined on a working surface;
   b) displacing the material in block or slab being machined on the working surface by means of a machine for machining materials comprising:
      a tool-holder unit displaceable above said working surface along a direction parallel and/or orthogonal with respect to the working surface;
      a manipulator unit of the material in block or slab coupled to said tool-holder unit and comprising gripping means of the material in block or slab, said gripping means being moveable between a first inoperative position, distal with respect to the material in block or slab, wherein a machining tool of the tool-holder unit is arranged to machine the material in block or slab, and a second operative position, proximal with respect to the material in block or slab, wherein the machining tool of the tool-holder unit cannot interact with the material in block or slab being machined;
   c) carrying out a machining operation on said material in block or slab;
wherein displacing the material in block or slab being machined on the working surface comprises rotating as a unit the gripping means and the tool-holder unit between said first inoperative position and said second operative position.

14. The method according to claim 13, wherein rotating as a unit the gripping means and the tool-holder unit further comprises:

rotating the tool-holder unit from a respective first operative position wherein a tool attached to the tool-holder unit can interact with the material in block or slab to a respective second inoperative position of the tool-holder unit wherein said tool can not interact with the material in block or slab.

15. The method according to claim 14, wherein said gripping means are fixed to the tool-holder unit while rotating between said first inoperative position and said second operative position and wherein said gripping means and said tool-holder unit rotate about a horizontal axis E-E.

16. The method according to claim 14, comprising:

rotating the gripping means in their respective second operative position and at the same time rotating the tool-holder unit in their respective second inoperative position;

bringing the gripping means in abutment against a surface of the material in block or slab placed on the working surface in an initial position;

activating the gripping means to hold the material in block or slab;

rearranging the material in block or slab on the working surface by displacing the gripping means in a direction which is parallel and/or orthogonal to the working surface and/or by rotating the gripping means about a vertical direction, and deactivating the gripping means to release the material in block or slab in a new final position.

17. The method according to claim 14, wherein carrying out a machining operation on said material in block or slab comprises:

rotating the tool-holder unit in its respective first operative position and at the same time rotating the gripping means in their respective first inoperative position;

bringing a tool attached to the tool-holder unit in abutment against a surface of the material in block or slab placed on the working surface;

activating the tool and displacing the tool-holder unit as required.

18. The machine according to claim 13, wherein said gripping means are pneumatic and wherein displacing the material in block or slab being machined on the working surface further comprises activating or deactivating the gripping means for holding or releasing, respectively, the material in block or slab with respect to the gripping means.

* * * * *